UNITED STATES PATENT OFFICE.

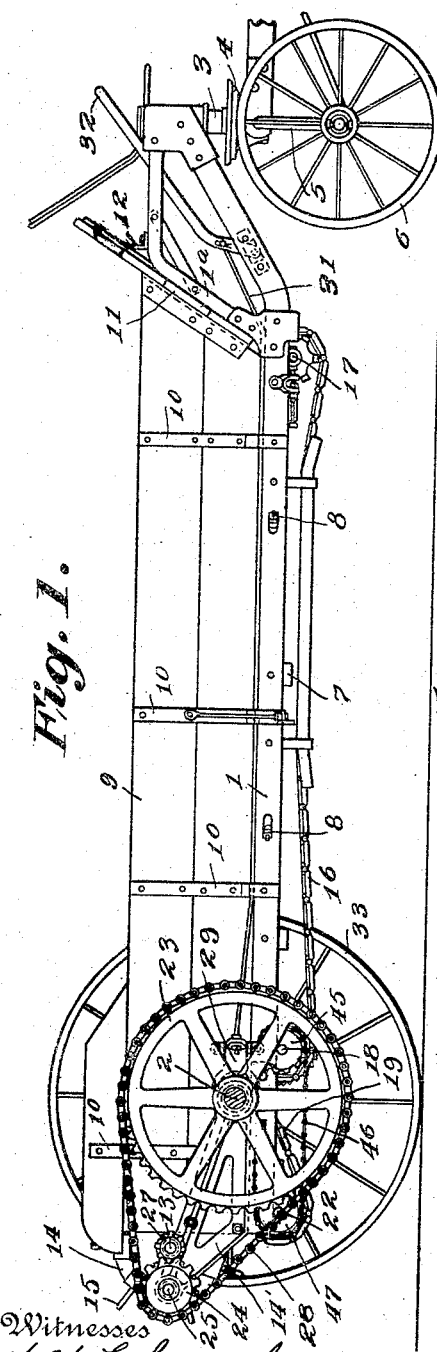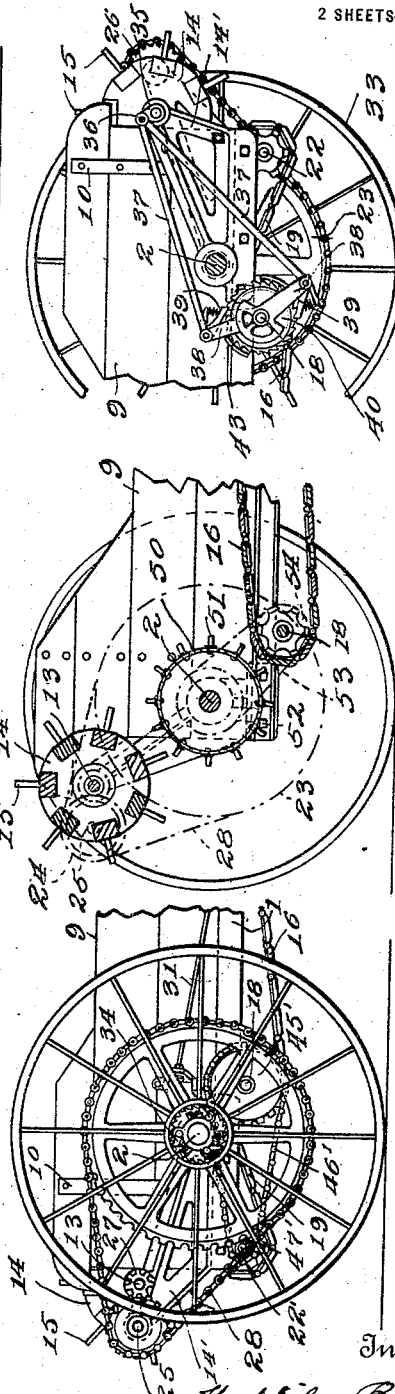

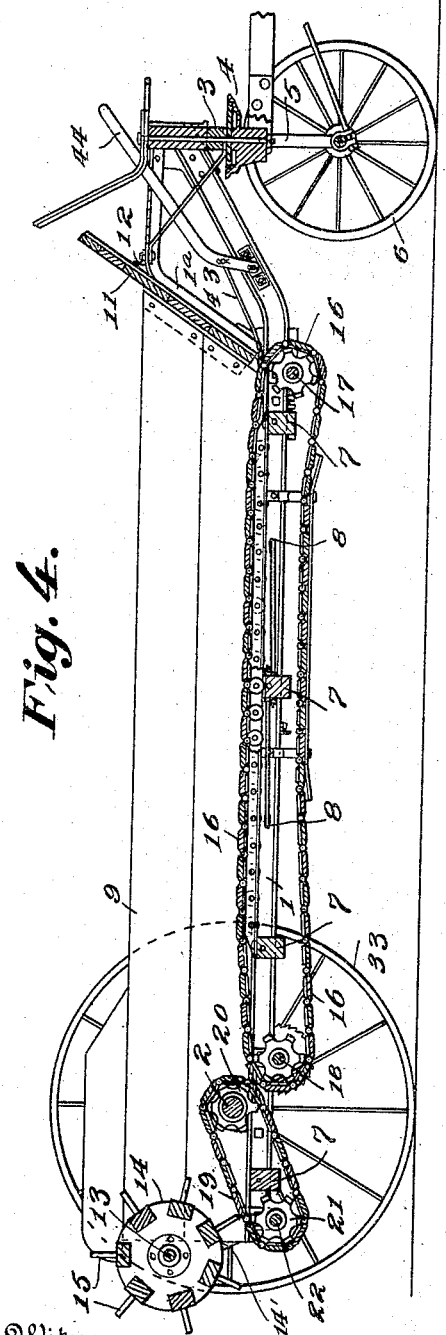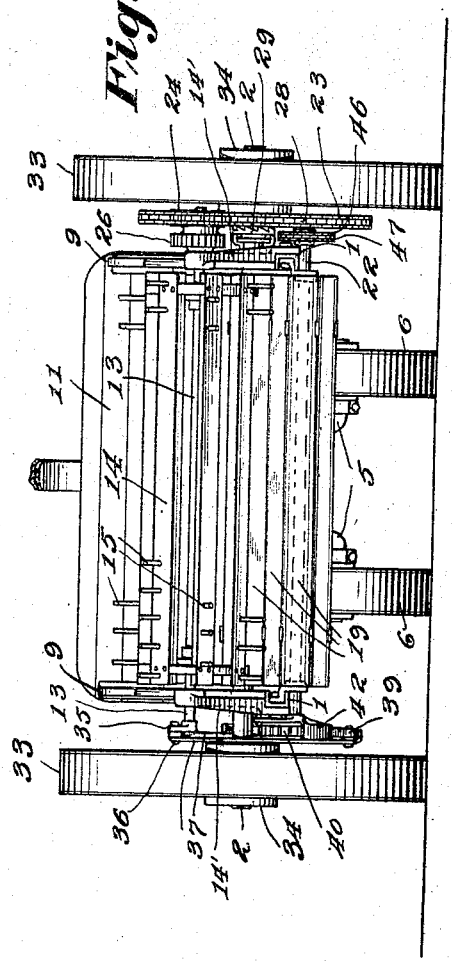

THEOPHILUS BROWN, OF MOLINE, ILLINOIS, ASSIGNOR TO MARSEILLES COMPANY, OF EAST MOLINE, ILLINOIS, A CORPORATION OF ILLINOIS.

MANURE-SPREADER.

1,189,658.  Specification of Letters Patent.  Patented July 4, 1916.

Application filed January 23, 1913. Serial No. 743,879.

*To all whom it may concern:*

Be it known that I, THEOPHILUS BROWN, a citizen of the United States, residing at Moline, in the county of Rock Island and State of Illinois, have invented certain new and useful Improvements in Manure-Spreaders, of which the following is a specification, reference being had therein to the accompanying drawing.

My invention relates to improvements in manure spreaders of the class in which each manure spreader comprises a vehicle having a load-carrying body, supporting wheels, a rapidly revolving, distributing beater at or near the rear end of the body, means for gradually carrying the load backward from the forward part of the vehicle to points where it can be engaged by the beater and can be shredded by the latter and scattered widely and uniformly over the ground at the rear end of the vehicle as the latter moves across the field.

The improvements which I have made are particularly intended for mechanisms of the subclass known as "low down" spreaders. It is now well-known that numerous important advantages are incident to machines of this class. They are so constructed that the load-supporting and rearward feeding devices at the bottom of the forward portion of the load-receiving-and-carrying chamber are arranged relatively near the ground or in low horizontal planes. The load can not only be put into the vehicle with much greater ease than is the case where the receiving part or chamber of the vehicle is in relatively high planes; but, moreover, the center of gravity of the vehicle and of its load is lowered so that the machine can be transported with steadiness over rough and uneven ground, and can be moved by the team much more easily than when the center of gravity is in an elevated plane. And numerous designs for "low down" machines have been proposed. These may be regarded as typified by the mechanism shown in my Patent No. 986,903, dated March 11, 1911, and reissued as No. 13,318 on the 21st day of November, 1911. Under many circumstances, however, difficulty has been experienced with machines of this sub class as heretofore constructed, largely because of the fact that the low position of the load supporting and feeding devices, apron, or the like, necessitates a correspondingly low mounting for the beater, and consequently, the distance from the beater to the ground being reduced, the scattering action of the distributing parts is equivalently reduced. One of the purposes of the present invention is to provide a mechanism of this class which shall retain the established advantages of the "low down" load-carrier and feeder, and yet make available the advantages incident to the machines which have the rapidly revolving distributing beaters in a relatively high position, toward the top planes of the vehicles.

When the beater is thus arranged in relatively elevated position, it becomes practically necessary to support it upon the light, upwardly projecting parts of the sides or framework of the vehicle. And experience has shown that this arrangement of the distributer, in turn, introduces disadvantages which it is necessary to avoid. The rapid rotations, vibrations and jars that are imparted to the vehicle and its frame from the rapid movements of the beater speedily loosen the lighter parts of the mounting and support and subject them to tendency to breakage. This I overcome by so arranging the rear driving ground wheels and their axle that these parts, (particularly those forming parts of or adjacent to the axle structure itself,) can be utilized as a bracing and binding mechanism for strengthening the beater supporting elements. The axle is extended continuously across the vehicle from one ground wheel to the other and the body is supported upon it in such way that it sustains the beater and counteracts its tendency to jar, loosen and break the supporting parts. But this arrangement of the axle, that is, extending it entirely across the body, in turn, introduces difficulties, inasmuch as it, the axle, is thus placed above the horizontal plane of the load-supporting-and-feeding elements in the front part of the vehicle, and it lies directly in the normal path of the material as it is being moved backward toward the rear. These latter difficulties I have overcome by combining with the structural elements above described, means for taking the material from the load-supporting-and-feeding devices in the forward part of the vehicle and elevating it to planes above and carrying it over, the axle to the relatively elevated beater. I am thus enabled to combine in one machine all of the advantages above specified; to have the load-receiving chamber in low planes; to dispose the distributing beater in relatively high position where it can effectively scatter the manure over a wide space; to brace and strengthen the side structures and the framework of the body by means of an axle positioned well above the bottom parts of the structure, even though this axle is in a position where it would not only normally impede but entirely stop the backward feeding of the material; and to carry the material upward from the low support at the front to the elevated beater at the rear.

Any of various means can be used for carrying the material from the front lower support to points above and around the axle, such as a supplemental endless apron carrier, a rotating cylinder or drum, or a stationary floor-like chute or guide upon which the material can rise and go backward, impelled in any preferred way. In the present instance, I employ a short supplemental apron, so arranged as to receive the material from the rear part of the main load-supporting and feeding apron. It travels around the axle and finally delivers the material to the feeder or distributer. There are a number of advantages incident to this form of mechanism, as will be understood from the description below.

In the drawings, Figure 1 is a side elevation of a manure distributer embodying my improvements, with a rear wheel removed to show the feeder driving mechanisms. Fig. 2 is an elevation of the side opposite that shown in Fig. 1. Fig. 3 is a rear elevation. Fig. 4 is a longitudinal vertical sectional view. Fig. 5 is a fragmentary side elevation showing a modified arrangement of supplemental apron drive. Fig. 6 is a fragmentary vertical longitudinal sectional view of a modified form of movable bottom.

In the drawings, the machine as illustrated is a manure spreader of the low down class in which a through strengthening rear axle carries relatively large ground wheels and is positioned to bring the lower strata of the load mass in planes relatively near the ground.

The sills 1 extend from points at the rear of the through axle 2 beneath the axle forward along the bottom of the body to the front end and are there turned upward, as at 1ª. At the front upper ends they are joined by a transverse bolster 3 which in turn is supported by the fifth wheel 4, front axle 5, and relatively small front ground wheels 6. The side sills are joined together at suitable intervals by the cross braces 7 and tie-rods 8, which hold the sills in rigid parallel relation to one another and thus provide a rigid supporting frame for the load mass.

Side boards 9 extend upward from the sills 1 and are secured in place by vertical braces 10. The load masses are confined within the vehicle body at its forward end by a slanting front board 11 which rests against the forwardly inclined portions 1ª of the sills. A transverse angle bar 12 is bolted across the sills at the upper end of their inclination and serves as a further support for the inclined front board.

At the rear of the vehicle body there is a transverse shaft 13 which is journaled in brackets 14' carried upon the side sills 1 and side boards 9. The transverse shaft 13 carries a rotary beater 14 provided with the usual form of distributing fingers 15 which come in contact with the rear end of the load and shred the manure, throwing it upward and rearward upon the ground.

An endless movable apron 16 forms the bottom of the vehicle along its front portion and operates around suitable sprocket wheels carried upon the forward transverse shaft 17, and a rear transverse shaft 18. The forward shaft 17 is so positioned and secured to the under side of the sills 1 that the apron extends under the lower edge of the front board 11, and the rear apron carrying shaft 18 is journaled beneath the side sills 1 at a point adjacent to but slightly in advance of the through axle 2.

A second or supplemental apron 19 rotates around sprockets 20 loosely journaled on the through axle 2, and sprockets 21 carried by the shaft 22 journaled beneath the rear end of the sills 1. This positioning of the two aprons places them in such a relation that the forward end of the apron 19 slightly overlaps the rearward end of the apron 16, the uppermost surface of the apron 19 then extending rearward and downward to points beneath the beater 14. The upper stretches of the apron 16 are in an approximately horizontal plane and carry the load rearward to a point where it comes in contact with the apron 19 the forward end of which elevates the load mass upward and over the axle and then carries it rearward and downward to the rapidly rotating beater 14.

The beater driving mechanism comprises the axle driven sprocket 23, chain connected to a smaller sprocket 24, which rotates upon a stub shaft 25 carried in one of the brackets 14', the gear 26 secured to the sprocket 24, and the pinion 27 carried by the end of the beater shaft 13. The forwardly moving sprocket 23 through the chain 28 drives the sprocket 24 in a clockwise direction. The gear 26 carried by the sprocket 24 therefore drives the beater pinion 27 in a counter-clockwise direction, this change in the direction of rotation between the axle and beater being necessary so that the forward part of the distributing beater will move upward and rearward carrying the shredded particles of manure upward from the load and spreading them in a shower or spray upon the ground.

A clutch mechanism 29 is placed between the through axle 2 and the sprocket wheel 23 and is connected by means of the levers and rod 30, 31, and 32, so that the sprocket may be connected to or disconnected from the axle at the will of the operator riding on the front of the machine. By moving the hand lever 32 in one direction the clutch connects the wheel-driven axle 2 to the sprocket 23 causing the beater to rotate rapidly in a rearward direction for distributing the load. On the lever being moved in the opposite direction the clutch is thrown out of engagement and the beater is allowed to come to rest.

The ground wheels 33 carried at each end of the through axle 2 are provided at their hubs with ratchet mechanisms 34 which connect the wheels to the axle when they are rotating in the forward direction only, thus providing an equalizing gear which is of advantage principally in turning corners where one wheel rotates faster than the other.

The rearward shaft 18 around which rotates the front apron 16 is driven at a slow rate of speed directly from the beater axle 13 through a pawl and ratchet mechanism. A collar 35 is secured to the end of the shaft 13 opposite to that on which the pinion 27 is secured and carries a crank pin 36 upon which the rear ends of two pitmen 37 are journaled. The front pitmen 37 extend upon opposite sides of the axle 2 and at their forward ends are journaled or pivotally connected to the outer ends of the two ratchet arms 38 which at their centers are loosely mounted upon the shaft 18. The ratchet arms 38 carry two pawls 39 which contact with the ratchet teeth 40 cut in the periphery of a ratchet wheel 41 loosely journaled upon the shaft 18. Pawl blankets 42 are connected by means of a rod 43 to a lever 44 at the front of the machine within reach of the operator. The blankets are so positioned that on being rotated in one direction or the other the effective throw of the ratchet pawls 39 is varied and the speed or rate of load feed thereby increased or decreased at the will of the operator. An eccentric gear connection is provided between the ratchet wheel 41 and the shaft 18 this being provided to prevent movement of the feed apron except as it receives motion from the pawl and ratchet. This apron lock is shown and described in my co-pending application, Ser. No. 620,145, filed April 10, 1911.

A sprocket wheel 45 is secured on the end of the shaft 18 opposite to the end upon which is mounted the ratchet driving mechanism, this sprocket being connected by means of a chain 46 to a sprocket 47 carried on an end of the shaft 22 by means of which the apron 19 is operated. In this way since power is transmitted from the beater to the shaft 18 causing the apron 16 to move rearwardly at a slow rate of speed, and as the shaft 18 is in turn connected to the shaft 22, the apron 19 will likewise move rearwardly at the same speed.

In Fig. 5 I have shown a modified arrangement of gearing in which the sprocket 45' mounted on the end of the shaft 18 drives through a chain 46' a smaller sprocket 47' on the shaft 22. This modification permits the second apron 19 to be driven at a rate in excess of that of the apron 16, thus permitting the load mass after having been raised up over the axle 20 and thereby loosened, to be fed down the inclined apron 19 at an increased speed, thus further disintegrating the load mass and shaking it up before it comes in contact with the rotating beater.

The control of the entire machine both as to starting and stopping of the distributing operation and as to the varying of the rate of distribution is controlled by means of the two levers 32 and 44. The lever 32 starts or stops the rotation of the beater and since the apron feeding mechanism derives its power from the distributer shaft likewise starts or stops the rearward movement of the load mass. By operating the lever 44, variations in the rate of distribution, as for example the number of bushels spread per acre, is obtained.

In this machine I have positioned the parts so that a through strengthening axle is used in connection with a low down body and a beater carried at points remote from the axle. The axle passes through what would normally be the path of the load in its rearward travel to the beater. The supplemental apron rotating around the axle serves as one of its purposes to remove the material from in front of the axle, elevate it above the axle and advance it rearward to the beater. The forward apron supports the main body of manure and advances it rearward to a point slightly in front of the rear axle. The rear supplemental apron overlaps the forward apron, catches the rearward moving load at a point in front of the axle, carries it upward and then downward on an incline to the beater. This action loosens the body of manure as it nears the distributing beater and as a result the manure is spread more evenly and with less power. The breaking up of the load a few feet ahead of the beater and its passage backward and downward to the beater in a loose mass, lightens the draft very considerably.

The parts 16 and 19 constitute the entirety of the bottom structure extending from the beater to the front end board; and this may be regarded as having a front portion, a portion adjacent to and moving upward and over the axle, and a portion moving backward from a line above the axle to the beater. These portions of the bottom structure are shown as composed of two, or more, aprons, but I do not intend to limit myself to such a specific form of apparatus, as the purposes at which I aim can be accomplished with modified apron structures, or other devices. These purposes relate to having the forward portion of the bottom structure in relatively low planes, and having it move the material backward in the horizontal lines of the axle, and then lifting and lightening up the material by the second portion of the bottom structure which moves up from the plane of the forward section and carries the material over the axle with a positive lifting action; and to having the material carried backward, and preferably somewhat downward, to the beater by the third portion of the bottom structure.

The modification shown in Fig. 5 permits of the rear supplemental apron traveling at a speed greater than that of the forward apron. This insures a better pulverization of the load and also prevents any clogging of the material between the rear end of the forward apron and the forward end of the rear apron.

A further advantage possessed by my improved spreader is the positioning of the lower strata of the load mass contained within the body of the vehicle in planes relatively close to the ground without at the same time limiting the vertical position of the rotary beater to one in which its lower path of travel passes through the lower strata of the major portion of the load. By carrying the major portion of the load upon a horizontal conveyer close to the ground and terminating it ahead of the beater, or at least terminating the load carrying section ahead of the beater, and by providing a device for receiving the load or taking it from the first conveyer and by means of this second arrangement carry it into any desired vertical plane, it is possible for me to position the rotary beater at a vertical height independent of the planes in which the major portion of the load mass is carried. On the other hand I have overcome the disadvantages incident to mounting the heavy rapidly rotating beater at a distance from the axles and sills by passing the ground wheel carrying axle directly through the sides of the vehicle above the sills and thus rigidly hold the sides of the vehicle from destructive vibration and side movement.

In the modification shown in Fig. 6 I have substituted for the supplemental apron 19 shown in the other views, a slowly rotating drum 50 concentric to the axle 2 and loosely journaled thereon. Short spikes or teeth 51 are inserted in the periphery of the drum to assist in gripping the lower strata of the load to raise it up and over the axle to the distributing beater. In this case the main apron 16 is lowered considerably below the axle 2 and the shaft 13 of the distributing beater is raised to points considerably higher than the position shown in the other views. The beater is driven through a mechanism identical with that shown in Fig. 1, the large sprocket wheel 23, chain 28, a small sprocket 24, and the gear and pinion connecting the shaft 25 with the beater shaft 13 being indicated by dotted lines. The shaft 18 about which rotates the rear end of the apron 16 is driven through a pawl and ratchet mechanism, as shown in Fig. 2. The drum 50 is driven through a sprocket 52, chain 53, and sprocket 54. The train of motion is therefore very similar to the first described machine.

What I claim is:

1. In a manure spreader, the combination of the front wheels, the rear wheels, the body, the rear axle extending directly through the body, the movable bottom support for the material arranged to carry it directly toward, and on the horizontal lines of, the axle, a rapidly rotating beater in the rear part of the body on an axis behind the axle, and relatively slowly traveling material-moving devices arranged to lift the material from the region in front of the axle and in horizontal planes below it and carry it over the axle and deliver it to the rapidly rotating beater.

2. In a manure spreader, the combination of the front wheels, the rear wheels, the body, the rear axle extending directly through the body, the movable bottom support for the material arranged to carry it directly toward, and on horizontal lines of, the axle, a rapidly rotating beater on an axis behind the axle, and an endless apron supplemental to the aforesaid movable bottom support, and arranged to receive the material delivered therefrom at points in front of the axle and carry it past the latter and deliver it to the rapidly rotating beater.

3. In a manure spreader, the combination of the rear wheels, the body, the rear axle extending directly through the body, the movable apron support at the bottom of the body mounted at its rear on an axis below that of the axle and arranged to form a chamber in the front part of the body below the horizontal planes of the axle and to carry material directly toward the latter, a rapidly rotating beater in the rear part of the body on an axis behind the axle, a second supplemental endless apron having its front part mounted directly on the axle and driven thereby and arranged to take material from the first aforesaid apron and lift it over the axle and deliver it to the beater.

4. In a manure spreader, the combination of a vehicle body, a movable bottom therein for supporting and feeding the material rearward, the rear ground wheels, the through axle extending from one ground wheel to the other and situated above the carrying apron, the rotary distributer on an axis above the through axle, and movable means for supporting and guiding the material of the load on lines extending over the axle as said material is moved backward.

5. In a manure spreader, the combination of a vehicle body, means for supporting and feeding the material backward in the vehicle, the rear ground wheels, a through axle passing across the body from one ground wheel to the other and having its axis situated above the said means for feeding the material backward, a distributing beater behind the axle, and moving means supplemental to the distributer for passing the material of the load upward and over the axle to the beater.

6. In a manure spreader, the combination of a forward load carrying body structure, a movable bottom element therein for supporting material and feeding it rearward, rear ground wheels, a through axle extending from one of the said ground wheels to the other and having its intermediate parts lying in the horizontal planes of the bottom part of the load mass, a distributing beater mounted on an axis above and at the rear of the axle and arranged to have its operative parts rotate across the horizontal planes of the upper part of the load mass, and a supplemental movable bottom element for transferring the load from the aforesaid bottom element in the forward body structure to the beater.

In testimony whereof I affix my signature, in presence of two witnesses.

THEOPHILUS BROWN.

Witnesses:
  H. B. McKAHIN,
  JOSEPH H. BROWNING.